US006722007B2

(12) United States Patent
Lin

(10) Patent No.: US 6,722,007 B2
(45) Date of Patent: Apr. 20, 2004

(54) ELECTRIC CORD CONNECTOR KIT

(76) Inventor: Chia Hsien Lin, 7223 N. Lotus Ave., #B, San Gabriel, CA (US) 91775

(*) Notice: Subject to any disclaimer, the term of this patent is extended or adjusted under 35 U.S.C. 154(b) by 80 days.

(21) Appl. No.: 10/054,470

(22) Filed: Jan. 24, 2002

(65) Prior Publication Data

US 2003/0139085 A1 Jul. 24, 2003

(51) Int. Cl.[7] .................................................. B23P 19/04
(52) U.S. Cl. ......................... 29/268; 29/270; 29/243.56
(58) Field of Search .......................... 29/268, 270, 255, 29/243.55, 243.56, 278, 280; 269/3, 6, 903, 71, 95

(56) References Cited

U.S. PATENT DOCUMENTS 4,476,616 A * 10/1984 Jensen ...................... 29/243.56
5,119,553 A * 6/1992 Sato ......................... 29/243.56
5,692,667 A * 12/1997 Chi ............................ 227/151
5,732,461 A * 3/1998 Keffeler et al. ............... 29/751
6,125,517 A * 10/2000 Yu ............................. 29/229

* cited by examiner

*Primary Examiner*—Lee D. Wilson
(74) *Attorney, Agent, or Firm*—Raymond Y. Chan; David & Raymond Patent Group

(57) ABSTRACT

An electric cord connector kit is adapted for electrically connecting two electric cords together and includes a connector which is made of flexible material and a pinching device. The connector includes an insulating layer, a fastening member, which is enveloped in the insulating layer, having two spaced apart fastening arms adapted for receiving the two electric cords therebetween, and a plurality of protuberances integrally projected from inner peripheries of the fastening arms of the fastening member through the insulating layer. The pinching device is arranged to hold the connector in position and compress the connector in such manner that the protuberances are penetrated through sheaths of the electric cords so as to electrically connect two conducting wires of the electric cords via the fastening member.

17 Claims, 5 Drawing Sheets

ELECTRIC CORD CONNECTOR KIT

BACKGROUND OF THE PRESENT INVENTION

1. Field of Invention

The present invention relates to an electric cord connecting device, and more particularly to an electric cord connector kit for electrically connecting two electric cords together.

2. Description of Related Arts

Electric cord is the most common tool in an electrical construction. All building constructions need to wire for electricity. All electrical components need wires to complete the circuit in electrical connection. In other words, any matter involved in an electrical connection must incorporate with electric cords.

For wiring the electricity, a lineman or a manufacturing worker usually uses an electric cord connector to electrically connect two electric cords together. A conventional electric cord connector generally comprises a conducting sleeve having a plurality of pressouts spacedly protruded from an inner surface thereof and an insulating jacket covered on the outer surface of the conducting sleeve in such a manner that when a compression force is applied on the conducting sleeve, two electric cords in the conducting sleeve are electrically connected together by the pressouts penetrating outer sheaths of the electric cords.

It is no doubt that such conventional electric cord connector can safely connect two electric cords together. However, the lineman who has experience of using the conventional electric cord connector may still have a common difficulty to manipulate the conducting sleeve so as to align the pressouts with the electric cords. Therefore, an individual who is not familiar with such technological field will finds difficulty to operate the electric cord connector.

Moreover, the installation operation of the conventional electric cord connector is complicated. The lineman needs to put the two electric cords within the conducting sleeve in a corrected alignment and then press the conducting sleeve via pliers. For industry use, the time for setting up the electric cord connection will be prolonged because of the interruption of the electric cord connector. Since the lineman may need to connect hundreds of electric cords daily, the conventional electric cord connector fails to provide a quick and easy connection for the electric cords, so as to highly increase the assembling cost of the electric cord connection.

SUMMARY OF THE PRESENT INVENTION

A main object of the present invention is to provide an electric cord connector kit which enables a user to quickly connect two electric cords together.

Another object of the present invention is to provide an electric cord connector kit, which is easy to use, wherein the user can simply place the electric cords through an discharge opening of a pinching device while a connector is pre-loaded at the discharge opening. By operating the pinching device, the connector is deformed to electrically connect the two electric cords together.

Another object of the present invention is to provide an electric cord connector kit, which can be quickly reloaded with the connectors. Moreover, it is easy to use and compact and convenience for carry.

Another object of the present invention is to provide an electric cord connector kit, wherein the connectors are pre-arranged in a strip manner and pre-loaded in the pinching device, such that the user does not need to reload the connector after every connection.

Accordingly, in order to accomplish the above objects, the present invention provides an electric cord connector kit for electrically connecting two electric cords each comprising a conducting wire protected by a sheath, wherein the electric cord connector kit comprises:

at least a connector comprising an insulating layer made of non-conductive material, a fastening member which is enveloped in the insulating layer having two spaced apart fastening arms adapted for receiving the two electric cords therebetween in a parallel manner, and a plurality of protuberances integrally projected from inner peripheries of the fastening arms of the fastening member and protruded through the insulating layer; and a pinching device, which receives and holds the connector in position, compressing the connector until the protuberances of the two fastening arms are penetrated through the sheaths of the electric cords so as to electrically connect the two conducting wires of the electric cords via the fastening member.

DETAILED DESCRIPTION OF THE PREFERRED EMBODIMENT

Figure 1:
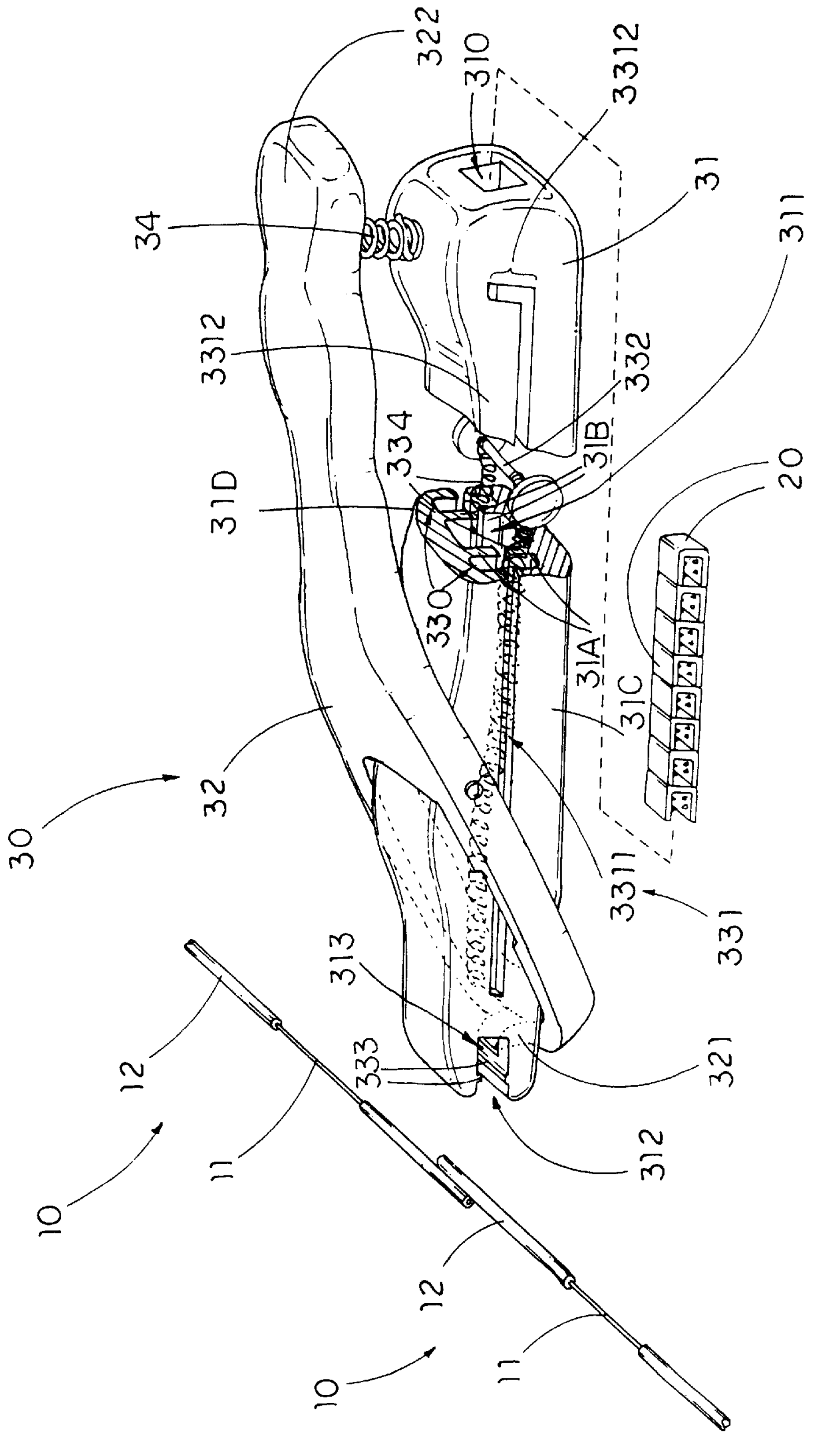
FIG. 1 is a partially sectional perspective view of an electric cord connector kit according to a preferred embodiment of the present invention.
Figure 2:
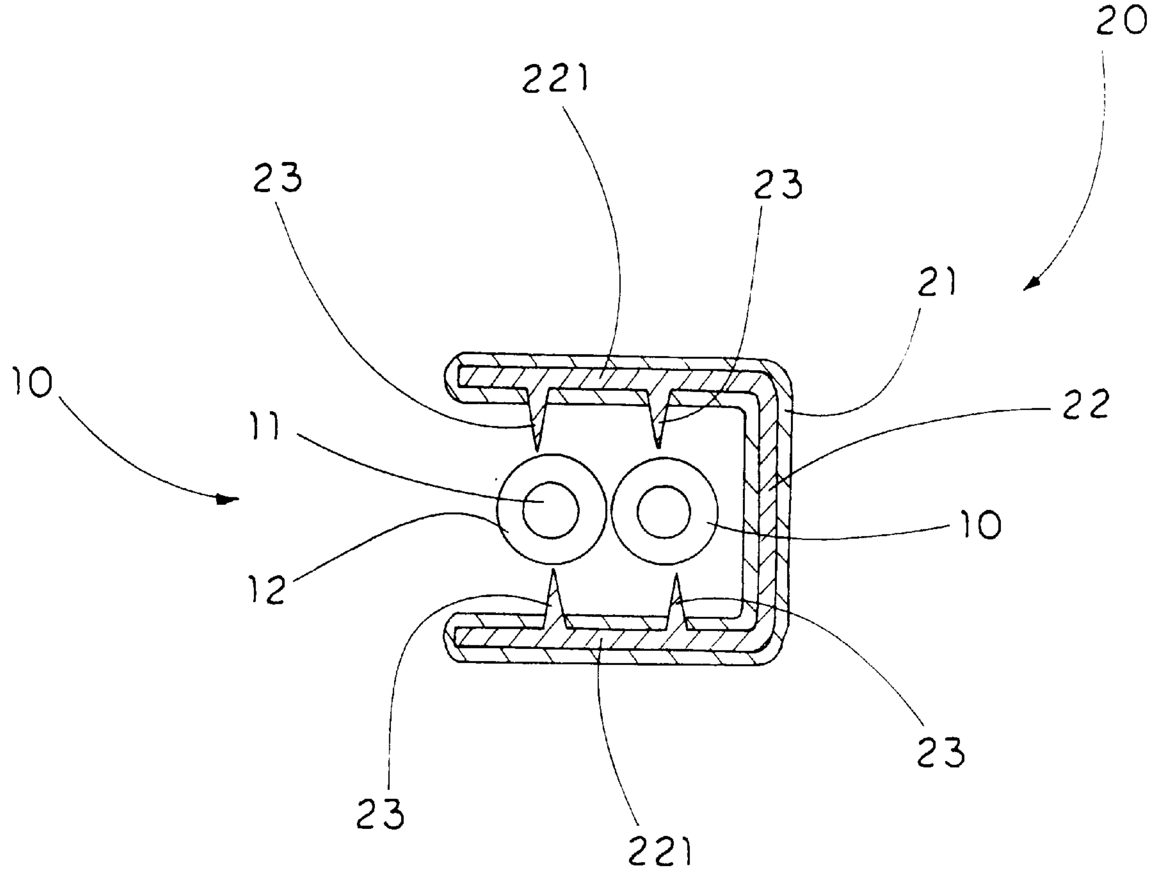
FIG. 2 is a sectional view of a connector of the electric cord connector kit according to the above preferred embodiment of the present invention.
Figure 3:
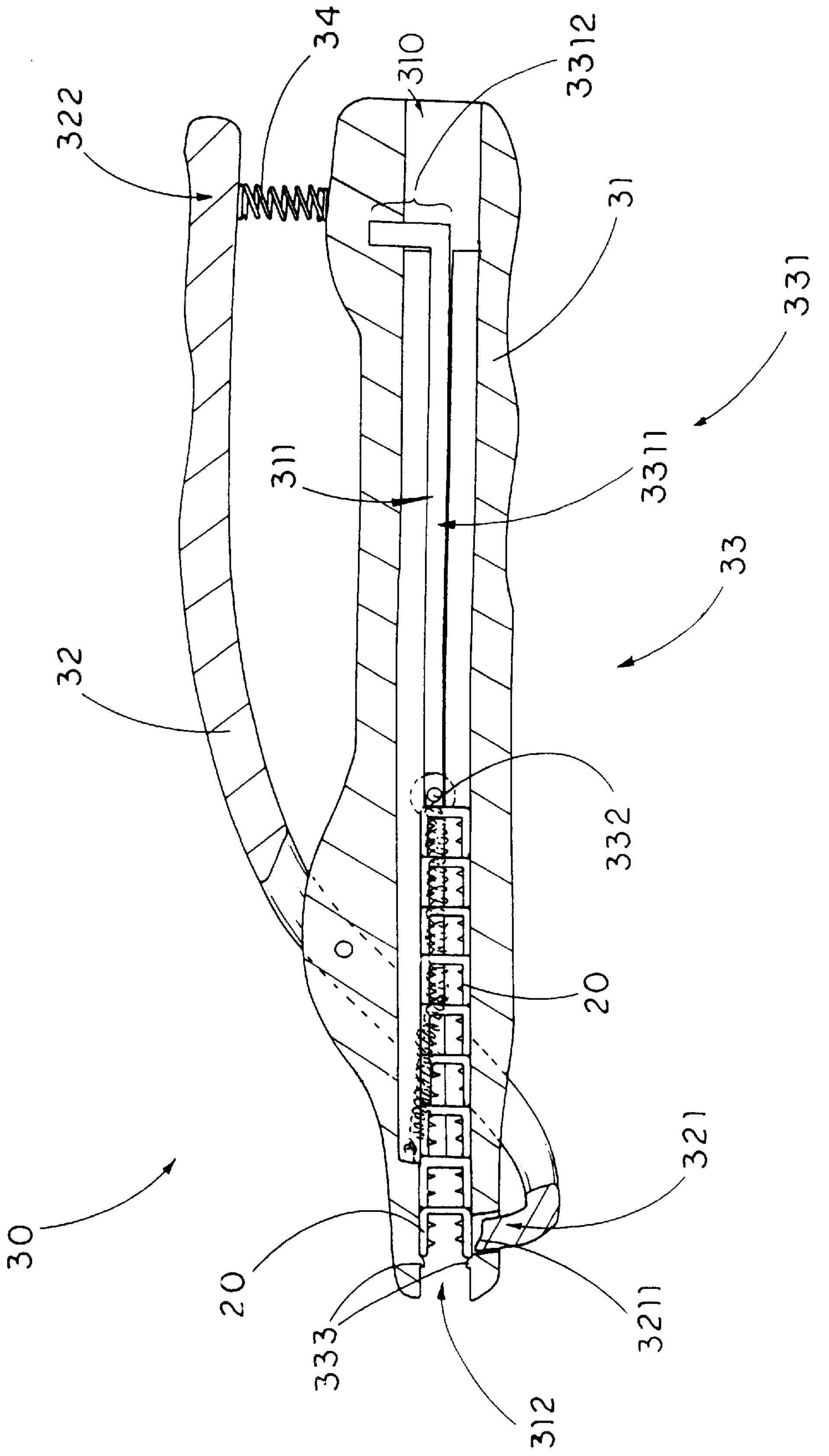
FIG. 3 is a sectional view of a pinching device of the electric cord connector kit according to the above preferred embodiment of the present invention.

Referring to FIGS. 1 through 3 of the drawings, an electric cord connector kit 2 according to a preferred embodiment of the present invention is illustrated, wherein the electric cord connector kit 2 is adapted for electrically connecting two electric cords 10 together. Each of the electric cords 10, such an ordinary electric cord, comprises a conducting wire 11 enwrapped and protected by a tubular sheath 12 which is made of non-conductive material.

According to the preferred embodiment, the electric cord connector kit 2 comprises at least a connector 20 and a pinching device 30 for mounting the connector 20 with the two electric cords 10 together so as to electrically connect the two conducing wires 11 together.

The connector 20, which is made of flexible material, comprises a fastening member 22 enwrapped by an exterior insulating layer 21 which is made of non-conductive material.

The fastening member 22, which is enveloped in the insulating layer 21, comprises two spaced apart fastening arms 221 for receiving the two electric cords 10 therebetween in a parallel manner and a plurality of protuberances 23 integrally projected from inner sides of the fastening arms 221 of the fastening member 22 and protruded through the insulating layer 21, as shown in FIG. 2.

The pinching device 30, which receives and holds the connector 20 in position, is arranged to compress the connector 20 until the protuberances 23 are penetrated through the sheaths 12 of the electric cords 10 so as to electrically connect the two conducting wires 11 of the electric cords 10 via the fastening member 22.

As shown in FIG. 2, the fastening member 22 is embodied to have a U-shaped structure wherein the two fastening arms 221 are parallel with each other to define a distance adapted for the two electric cords 11 positioning therebetween. The insulating layer 21 is made of non-conductive material such as plastic and sealedly coated around the entire fastening member 22, so as to provide an insulation ability for the fastening member 22.

The protuberances 23 are spacedly protruded from the inner peripheries of the fastening arms 221 of the fastening member 22 respectively in such a manner that the protuberances 23 provided on one of the fastening arms 221 are pointing to the other fastening arm 221. Each of the protuberances 23 has a tapered shape to form a sharp end portion penetrated through the insulating layer 21 and adapted for penetrating through the sheath 12 of the respective electric cord 10 to the conducting wire 11 thereof.

As shown in FIG. 3, the pinching device 30 comprises a main body 31 having a first end, an opposed second end, and an elongated feeding slot 311 extended from the first end towards the second end to define a discharge opening 312 at the first end. The main body 31 further has an operating slot 313 traversely provided at the discharge opening 312 for communicating the feeding slot 311 with outside and a feeding opening 310 provided at the second end of the main body 31 for enabling the connectors 20 to be slidably received in the feeding slot 311 through the feeding opening 310.

It is worth to mention that the feeding slot 311 is formed between two guide walls 31A, 31B of the main body 31 such that when the connectors 20 is slidably inserted into the feeding slot 311, the guide walls 31A, 31B of the main body 31 are capable of preventing an unwanted lateral movement of the connectors 20 along the feeding slot, so as to ensure the corrected alignment of the connectors 20 at the discharge opening 312.

The pinching device 30 further comprises an operation body 32 pivotally connected with the main body 31. The operation body 21 has a pressing head 321 extended to the discharge opening 312 of the main body 31 through the operating slot 313 and an operation handle 322 arranged to drive the pressing head 321 slidably entering into the feeding slot 311.

Each of the connectors 20 is fitted into the feeding slot 311 in a slidably movable manner, wherein the connector 20 is arranged to position at the discharge opening 312 in such a manner that the pressing head 321 of the operation body 32 is driven to bias against one of the fastening arms 221 of the fastening member 22 to compress the connector 20, so as to force the protuberances 23 to penetrate through the sheaths 12 of the electric cords 10 such that the two electric cords 10 are electrically connected together.

Accordingly, there is a plurality of connectors 20 slidably fitted into the feeding slot 311, wherein the connectors 20 are mutually and detachably bonded together by gluing the connectors 20 in a head-to-tail manner, so as to form a strip of connectors 20. In other words, a free end of each of the connectors 20 are detachably bonded to a back of the preceding connector 20, so as to orderly line up the connectors 20 in row.

As shown in FIG. 3, the pinching device 30 further comprises a resilient member 34 supported between the main body 31 and the operating body 32 for applying an urging pressure against the operating body 32 so as to normally retain the pressing head 321 of the operation body 32 sliding out of the feeding slot 311. The resilient member 34, according to the preferred embodiment, is a compression spring that has two ends biasing against the second end of the main body 31 and the operation handle 322 of the operating body 32. Accordingly, the resilient member 34 normally urges and retains the operating body 32 in a position that the pressing head 321 of the operating body 32 is slidably out of the feeding slot 311. Therefore, when a pressing force is applied on the operation handle 322 of the operating body 32 towards the main body 31, the pressing head 321 is driven toward the feeding slot 311 along the operating slot 313 so as to compress the connector 20. While the pressing force is released, the compressed resilient member 34 will be rebounded to its original form so as to push the operation handle 322 of the operating body 32 away from the main body 31, so that the pressing head 321 of the operating body 32 will move away from the feeding slot 311.

Figure 4:
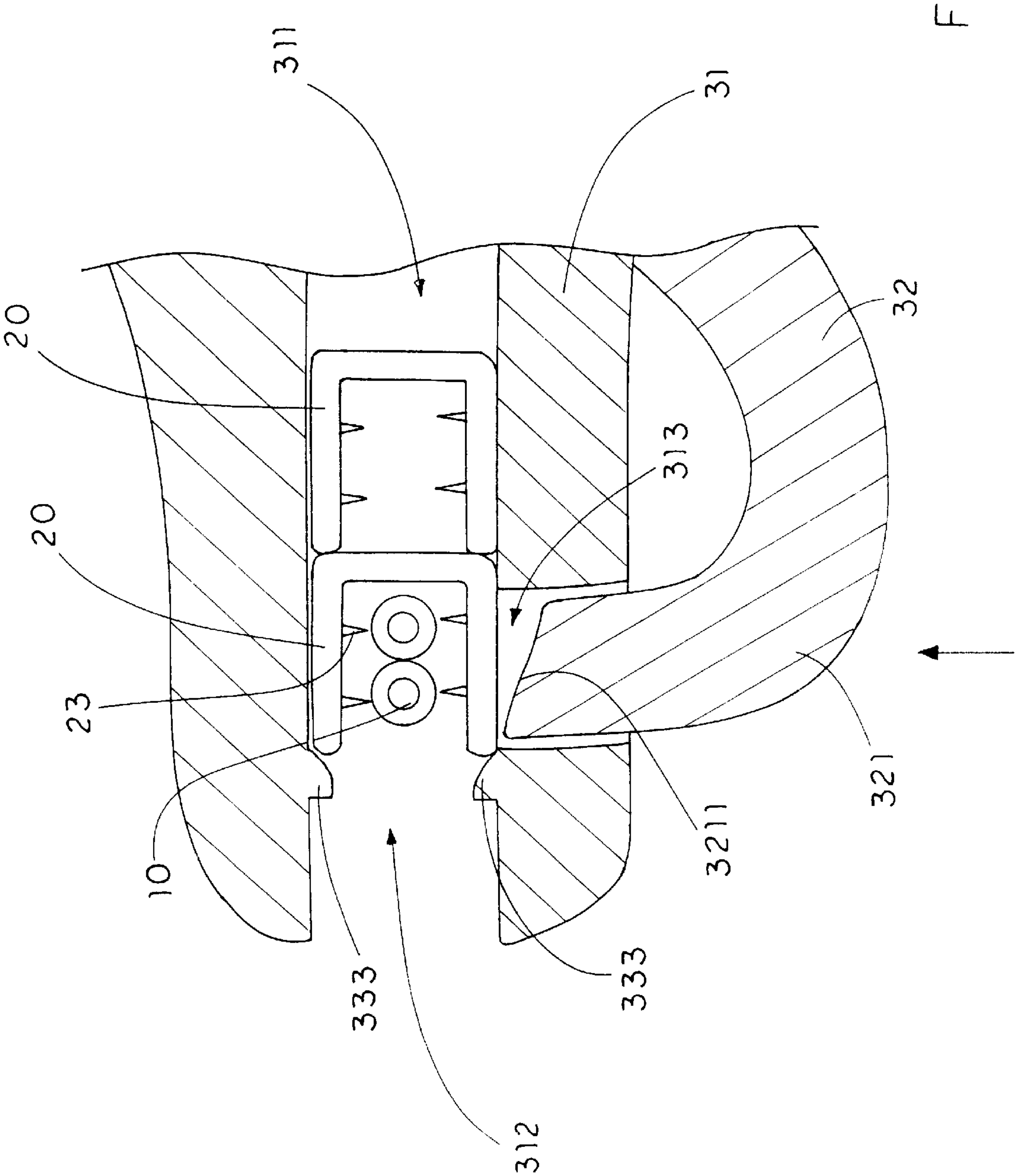
FIG. 4 is a partially sectional view of the electric cord connector kit according to the above preferred embodiment of the present invention.
Figure 5:
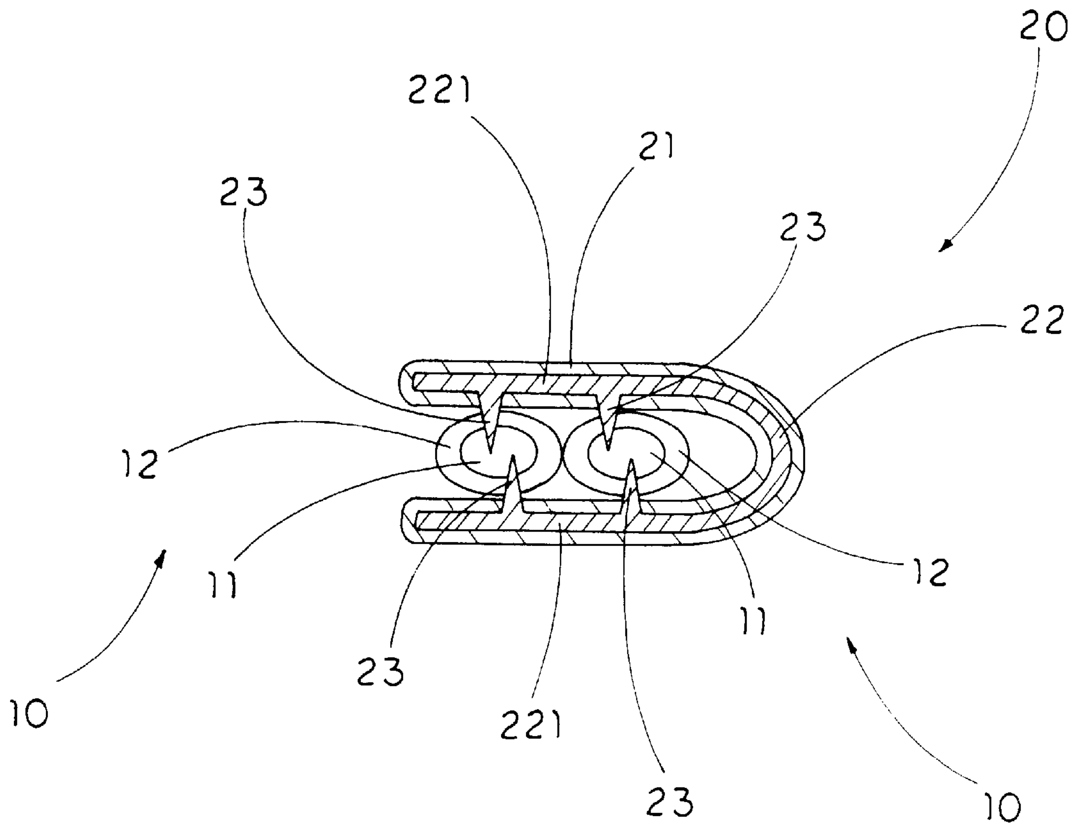
FIG. 5 is a sectional view of the connector mounted on two electric cords according to the above preferred embodiment of the present invention.

As shown in FIG. 4, the operating body 32 has a curved pressing surface 3211 provided at the pressing head 321 thereof, wherein the pressing surface 3211 of the operating body 32 is arranged to bias against the connector 20 to push the respective fastening arm 221 towards another fastening arm 221 of the connector 20 so as to ensure the electric cords 10 being enclosed by the two fastening arms 221 of the connector 20, as shown in FIG. 5.

Accordingly, only the protuberances 23 are arranged to penetrate to the conducing wires 11 of the electric cords 10 through the sheath 12 thereof, so that the two electric cords 10 are electrically connected together via the fastening member 22. Since the fastening member 22 is coated by the insulating layer 21, the insulating layer 21 at the inner surfaces of the fastening arms 221 will bias against the sheath 12 of the electric cords so as to sealedly connect the two electric cords 10 together and prevent the current leakage from the connector 20.

As shown in FIGS. 1 and 3, the pinching device 30 further comprises an auto-reloading unit 33 for pushing the connector 20 to the discharge opening 312 of the feeding slot 311 wherein the auto-reloading unit 33 has and two elongated resilient element housings 330 longitudinally extended between the two guide walls 31A, 31B and two outer side walls 31C, 31D of the main body 31 and two guiding through slots 331 provided along the two guide walls 31A, 31B and two outer side walls 31C, 31D of the main body 31.

The auto-reloading unit 33 further comprises a pusher member 332 slidably disposed across the feeding slot 311 while two enlarged ends of the pusher member 332 are extended to outside through the guiding through slots 331 respectively, at least a resilient element 334 is used for applying an urging pressure against the pusher member 332 so as to push the pusher member 332 towards the discharge opening 312 of the feeding slot 331, and at least a blocking flange 333 inwardly protruded from the feeding slot 311 at the discharge opening 312 for retaining the connector 20 at the discharge opening 312, so as to block up the connector 20 from sliding out of the discharge opening 312.

Accordingly, each of the guiding through slots 331 has a sliding portion 3311 longitudinally extended from the discharge opening 312 and a locking portion 3312 transversely extended from the sliding portion 3311 in such head-to-tail manner that the pusher member 332 is adapted to slide along the sliding portion 3311 of the guiding through slot 331 to the discharge opening 321 and to be held at the locking portion 3312 of the guiding through slot 331 in position.

According to the preferred embodiment of the present invention, two resilient elements 334, which are compression springs, are disposed in the two resilient element chambers 330 of the main body 31 respectively for providing even urging pressures against the pusher member 332, wherein each of the resilient elements 334 has two ends biased against a front wall of the respective resilient element housing 330 and the pusher member 332 in such a manner that the pusher member 332 will normally push the last connector 20 of the strip thereof until the first connector 20 is positioned at the discharge opening 312.

Therefore, when reloading the connectors 20, the pusher member 332 is pulled to receive in the locking portion 3312 of the guiding through slot 331 so as to retain the pusher member 332 in position. Then, while releasing the pusher member 332 to the sliding portion 3311, the expended resilient element 334 will be rebounded back to its original form so as to push the connectors 20 towards the discharge opening 312.

According to the preferred embodiment, two blocking flanges 333 are integrally extended from a top inner wall and a bottom inner wall of the feeding slot 311 at the discharge opening 312 respectively for blocking a top and a bottom free edge of the connector 20. Preferably, each of the blocking flanges 33 should have an inner curve edge which ensures the compressed connector 20 sliding out of the discharge opening 312 easily. The blocking flanges 333 are capably of not only preventing the connector 20 sliding out of the discharge opening 312 accidentally but also ensuring the connector 20 at a position that the pressing head 321 of the operation body 32 is pressed against the connector 20. Moreover, when the connector 20 is compressed, the connector 20 is deformed to reduce its size, so that the connector 20 will not be blocked by the blocking flanges 333 and can be slid out of the discharge opening 312. However the succeeding connector 20 in the feeding slot 311 will be pushed towards the discharge opening 312 and blocked by the blocking flanges 333 for next electrical connection of the electric cords 10.

What is claimed is:

1. An electric cord connector kit for electrically connecting two electric cords each having a conducting wire coated by a sheath, wherein said electric cord connector kit comprises:

a connector, comprising a fastening member having two spaced apart fastening arms adapted for receiving said two electric cords therebetween, an insulating layer which is made of non-conductive material enveloping said fastening member therein, and a plurality of protuberances integrally and spaced projected from inner sides of said fastening arms of said fastening member and protruded through said insulating layer; and a pinching device, which receives and holds said connector in position, compressing said connector until said protuberances of said two fastening arms are penetrated through said sheaths of said electric cords so as to electrically connect said two conducting wires of said electric cords via said fastening member, wherein said pinching device comprises a main body and an operation body pivotally connected to said main body, said main body having a first end, an opposed second end, an elongated feeding slot extended from said first end towards said second end to define a discharge opening at said first end, a feeding opening communicating said feeding slot with outside for feeding said connector into said feeding slot, an operating slot traversely provided at said discharge opening for communicating a front end of said feeding slot with outside, said operating body comprising a pressing head extended to said discharge opening through said operating slot and an operation handle arranged to drive said pressing head slidably entering into said feeding slot, wherein said feeding slot is adapted to receive said connector through said feeding opening in a slidably movable manner and said connector is arranged to position at said discharge opening in such a manner that said pressing head of said operation body is driven to bias against one of said fastening arms of said fastening member to compress said connector, for forcing said protuberances to penetrate through said sheaths of said electric cords.

2. The electric cord connector kit, as recited in claim 1, further comprising at least a second connector wherein said connectors are mutually and detachably bonded together in a head to tail manner to form a strip of said connectors.

3. The electric cord connector kit, as recited in claim 2, wherein each of said protuberances has a tapered shape to form a sharp end portion penetrated through said insulating layer and adapted for penetrating through said sheath of said respective electric cord to said conducting wire thereof.

4. The electric cord connector kit, as recited in claim 1, wherein said pinching device further comprises an auto-reloading unit, for slidably pushing said connector to said discharge opening of said feeding slot, having two guiding through slots longitudinally provided on two guide walls of said main body for communicating said feeding slot with outside, said auto-reloading unit further comprising a pusher member slidably disposed said feeding slot for pushing said connector towards said discharge opening while two ends of said pusher member are extended to outside through said guiding through slots respectively, and at least a resilient element for applying an urging pressure against said pusher m ember so as to push said pusher member towards said discharge opening of said feeding slot.

5. The electric cord connector kit, as recited in claim 4, wherein said auto-reloading unit further comprises at least a blocking flange inwardly protruded from said feeding slot at said discharge opening for retaining said connector at said discharge opening, so as to block up said connector from sliding out of said discharge opening.

6. The electric cord connector kit, as recited in claim 5, wherein said resilient element, which is a compression spring, is disposed in a resilient element housing transversely provided on said main body wherein said resilient element has two ends biased against a front wall of said resilient element housing and said driving end of said pusher arm in such a manner that said pusher end of said pusher arm normally pushes said connector until said connector is positioned at said discharge opening.

7. The electric cord connector kit, as recited in claim 5, wherein each of said guiding through slots has a sliding portion longitudinally extended from said discharge opening and a locking portion transversely extended from said sliding portion in a head to tail manner in such a manner that said pusher member is adapted to slide along said sliding portion of said guiding through slot to said discharge opening and to be held at said locking portion of said guiding through slot in position.

8. The electric cord connector kit, as recited in claim 6, wherein each of said guiding through slots has a sliding portion longitudinally extended from said discharge opening and a locking portion transversely extended from said sliding portion in a head to tail manner in such a manner that said pusher member is adapted to slide along said sliding portion of said guiding through slot to said discharge opening and to be held at said locking portion of said guiding through slot in position.

9. The electric cord connector kit, as recited in claim 8, wherein each of said protuberances has a tapered shape to form a sharp end portion penetrated through said insulating layer and adapted for penetrating through said sheath of said respective electric cord to said conducting wire thereof.

10. The electric cord connector kit, as recited in claim 9, wherein said operating body has a curved pressing surface provided at said pressing head thereof wherein said pressing surface of said operating body is arranged to bias against said connector to push said respective fastening arm towards to another said fastening arm of said connector.

11. The electric cord connector kit, as recited in claim 8, wherein said operating body has a curved pressing surface provided at said pressing head thereof wherein said pressing surface of said operating body is arranged to bias against said connector to push said respective fastening arm towards to another said fastening arm of said connector.

12. The electric cord connector kit, as recited in claim 4, wherein said resilient element, which is a compression spring, is disposed in a resilient element housing transversely provided on said main body wherein said resilient element has two ends biased against a front wall of said resilient element housing and said driving end of said pusher arm in such a manner that said pusher end of said pusher arm normally pushes said connector until said connector is positioned at said discharge opening.

13. The electric cord connector kit, as recited in claim 4, wherein each of said guiding through slots has a sliding portion longitudinally extended from said discharge opening and a locking portion transversely extended from said sliding portion in a head to tail manner in such a manner that said pusher member is adapted to slide along said sliding portion of said guiding through slot to said discharge opening and to be held at said locking portion of said guiding through slot in position.

14. The electric cord connector kit, as recited in claim 4, wherein each of said protuberances has a tapered shape to form a sharp end portion penetrated through said insulating layer and adapted for penetrating through said sheath of said respective electric cord to said conducting wire thereof.

15. The electric cord connector kit, as recited in claim 4, wherein said operating body has a curved pressing surface provided at said pressing head thereof wherein said pressing surface of said operating body is arranged to bias against said connector to push said respective fastening arm towards to another said fastening arm of said connector.

16. The electric cord connector kit, as recited in claim 1, wherein each of said protuberances has a tapered shape to form a sharp end portion penetrated through said insulating layer and adapted for penetrating through said sheath of said respective electric cord to said conducting wire thereof.

17. The electric cord connector kit, as recited in claim 1, wherein said operating body has a curved pressing surface provided at said pressing head thereof wherein said pressing surface of said operating body is arranged to bias against said connector to push said respective fastening arm towards to another said fastening arm of said connector.

* * * * *